J. C. ROSS.
GEARING.
APPLICATION FILED DEC. 30, 1920.
1,402,094.
Patented Jan. 3, 1922.
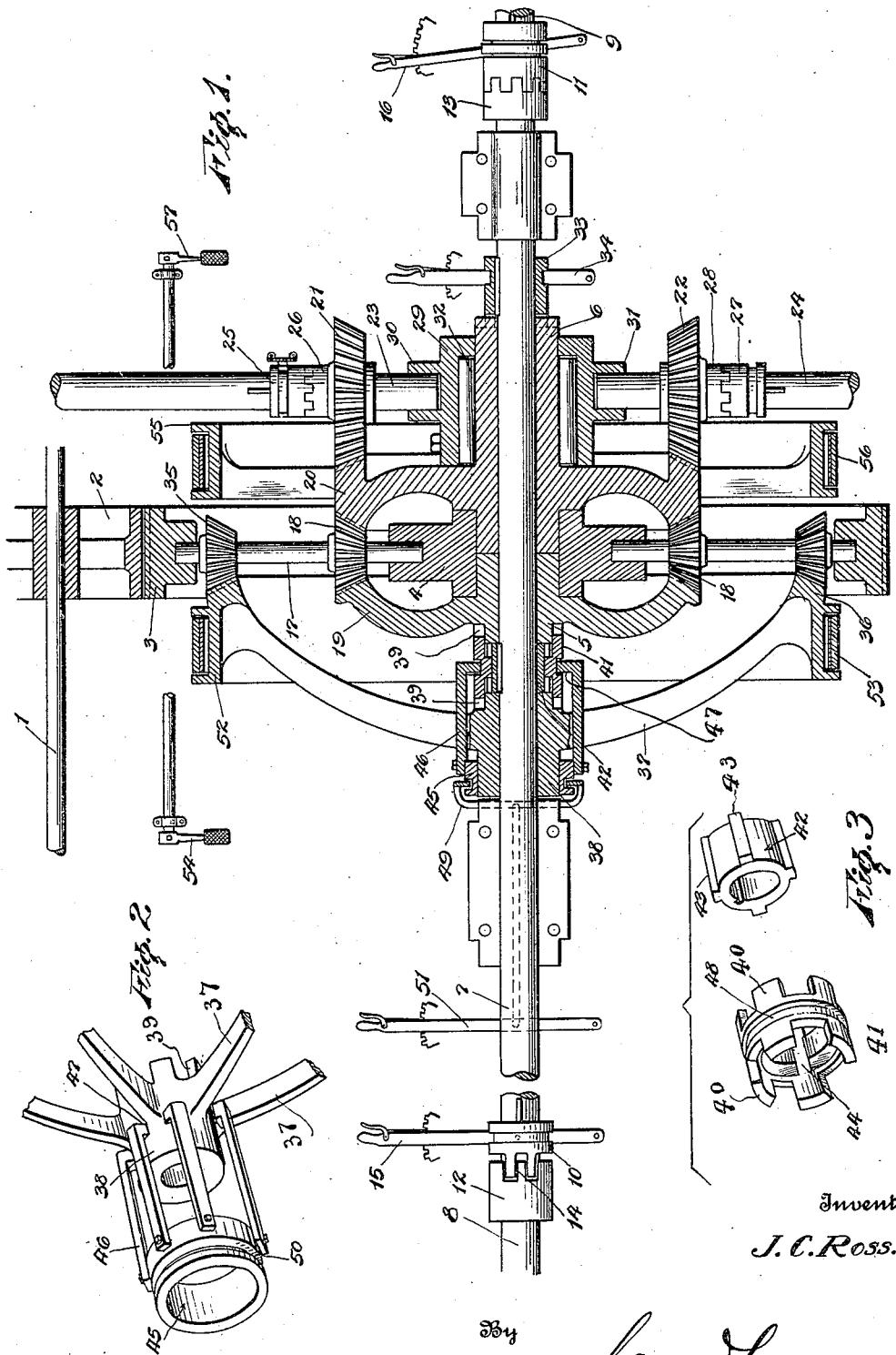
Inventor
J. C. Ross.
By
Lacey & Lacey, Attorneys

UNITED STATES PATENT OFFICE.

JOHN C. ROSS, OF AKRON, OHIO.

GEARING.

1,402,094.  Specification of Letters Patent.  Patented Jan. 3, 1922.

Application filed December 30, 1920. Serial No. 434,100.

*To all whom it may concern:*

Be it known that I, JOHN C. Ross, a citizen of the United States, residing at Akron, in the county of Summit and State of Ohio, have invented certain new and useful Improvements in Gearings, of which the following is a specification.

This invention relates to gearing for transmitting power from a driving shaft to a plurality of driven members and has speical reference to matter originally shown, described and claimed in an application for patent filed by me, July 23, 1919, Serial No. 312,665. The invention is illustrated in the accompanying drawings and will be hereinafter fully set forth.

In the drawings—

Figure 1 is a sectional elevation of gearing embodying my invention;

Figs. 2 and 3 are detail perspective views of certain clutch elements.

In the drawings, the reference numeral 1 indicates a driving shaft which may receive power from any preferred motor and has secured thereon a gear 2 meshing with a master gear 3. The hub 4 of the master gear is rotatably mounted upon the opposed ends of hubs 5 and 6 which are loosely fitted upon a shaft 7. Alined with the said shaft 7 are shafts 8 and 9 which may be operatively connected with the shaft 7 by clutches 10 and 11, respectively, adapted to engage clutch hubs 12 and 13, respectively, and these clutch members may be of any desired formation. In the illustration, the member 12 is fixed upon the shaft 8 and the clutch 10 is slidably mounted upon the end of the shaft 7, these members being provided with interengaging lugs, as shown at 14, and the clutch member being controlled by a shifting lever 15 which may be of any well-known or preferred form. The clutch member 13 is fixed upon the end of the shaft 7, while the clutch 11 is slidably mounted upon the shaft 9 and is controlled by a lever 16 which may likewise be of any desired formation. It will be readily understood that it is immaterial which member is slidably mounted upon its respective shaft and either arrangement may be employed as may be preferred.

The spokes 17 of the master gear are rotatably mounted in the hub and rim thereof and upon the said spokes are secured pinions 18 which mesh with gear rings 19 and 20 disposed at opposite sides of the master gear and carried by the hubs 5 and 6, respectively. The gear ring 20 is provided with gear teeth on both its sides at its perimeter and one series of teeth meshes with the pinions 18, as shown and as stated, while the other series of teeth mesh with pinions 21 and 22 which are loosely mounted upon shafts 23 and 24, respectively. Upon the shaft 23 is keyed a clutch member 25 shiftable into and out of engagement with the clutch hub 26 of the gear 21 by the manipulation of any convenient lever which may be of any desired type and is not illustrated herein for the sake of clearness in the drawings. In a similar manner, a clutch sleeve 27 is mounted upon the shaft 24 and shifted into or out of engagement with the clutch hub 28 of the gear 22 and it will be readily understood that by properly adjusting the clutches 25 and 27 the gears 21 and 22 may be locked to their respective shafts so as to transmit motion through the shafts to machinery operatively connected therewith. It will also be understood that the shafts 23 and 24 may be driven independently or simultaneously as may be needed. The hub 6 of the gear ring 20 is elongated so as to extend outwardly from the gear ring and pass through a stop box 29 which also provides end bearings for the respective shafts 23 and 24, as shown at 30 and 31, the end of said stop box being disposed adjacent the side of the gear ring 20 so as to prevent endwise movement of the said gear ring and its hub 6. Roller bearings 32 are disposed within the said box 29 around the hub 6 for an obvious purpose and the outer end of said hub is constructed with lugs or notches to be engaged by mating lugs or notches upon a clutch collar 33 keyed upon the shaft 7 and controlled by a lever 34.

Near the outer ends of the spokes 17, pinions 35 are secured thereto and these pinions mesh with a circular rack or gear ring 36 carried by spokes 37 extending from a hub or sleeve 38 which is loosely mounted upon the shaft 7 beyond the hub 5, as clearly shown. The opposed ends of the hubs 5 and 38 are notched, as indicated at 39, and are adapted to be engaged by the lugs 40 at the opposite ends of a clutch sleeve 41 which is slidably mounted upon a collar 42 keyed upon the shaft 7 between the opposed ends of the hubs 5 and 38, as clearly shown in Fig. 1. Upon the exterior circumferential surface of the collar 42 are longitudinal ribs 43 which are engaged by longitudinal grooves 44 provided on the interior surface of the sleeve 41 so that the said sleeve will rotate with the collar and the shaft and may be adjusted longitudinally thereof so as to couple either hub or both hubs to the collar. To adjust the sleeve 41, I provide a ring 45 which is slidably mounted upon the outer end of the hub 38 and has secured thereto a plurality of fingers 46 which extend between the spokes 37 of the gear ring 36 and have their inner ends turned inwardly, as shown at 47, to play in an annular groove 48 provided in the exterior surface of the sleeve 41, as clearly shown. A yoke 49 has its ends engaged in an annular groove 50 in the exterior surface of the ring 45 and this yoke is connected with a hand lever 51 so that the rocking of the lever will shift the yoke and consequently the ring 45 and the sleeve 41 longitudinally whereby to lock either or both of the gear rings 19 and 36 to the shaft 7.

A brake drum 52 is connected rigidly with the rack or gear ring 36 and a brake band 53 encircles the said drum and is controlled by a foot lever 54 in a well-known manner whereby to be tightened about the drum or released therefrom. A similar brake drum 55 is carried by the gear ring 20 and a brake band 56 is fitted around the said brake drum and controlled by a foot lever 57.

It will be readily seen from the foregoing description, taken in connection with the accompanying drawings, that I have provided a train of gearing through which power may be transmitted to four different points from a single driving shaft and it may be transmitted to one of these points or to all four of them simultaneously. In the position shown, the gear ring 20 is locked to the shaft 7 by the clutch 33 controlled by the lever 34, and the gear rings 19 and 36 are both coupled to the said shaft by the clutch sleeve 41 and collar 42 while the gears 21 and 22 are also locked to their respective shafts. If the driving shaft be set in motion, power will be transmitted simultaneously to all four driven elements. The shaft 8 or the shaft 9 may be released so as to remain at rest by properly manipulating the lever 15 or the lever 16 and likewise the shaft 23 or the shaft 24 may be permitted to remain at rest by properly shifting the clutch 25 or the clutch 27. In this arrangement, the master gear with the pinions 18 and 35 will rotate as an entirety, the pinions 18 and 35 being locked against rotation by reason of the engagement of the pinions 18 with both racks 19 and 20. If the clutch 33 be withdrawn from the hub 6 and the clutch sleeve 41 be also released from the hub 5, both gear rings 19 and 20 will be free upon the shaft 7 while the gear ring 36 will be locked thereto, but the gear ring 20 will remain operatively connected with the shafts 23 and 24 and the power of the master gear will be transmitted proportionately through the gear 20 to the shafts 23 and 24 and through the gear ring 36 to the shaft 7 from the outer pinions 35, a greater leverage being thus exerted through the gear 36 upon the shaft 7 than if the gear ring 19 were alone locked to the shaft and the master gear. If the clutch sleeve 41 be shifted inwardly so as to be released from the hub 38, the hub 5 will be locked to the shaft 7 and the power of the master wheel will be transmitted to said shaft through the inner pinions 18, exerting less leverage than in the former instance.

With the parts in the positions shown, there can be no compensating or differential movement. If the clutch 33 be moved to inactive position the member 20 will be freed from the shaft 7 and may move differentially in respect to said shaft. If the clutch sleeve 41 be moved inwardly so as to free the gear ring 36 from the shaft 7, the power will be divided equally between the shaft 7 and the parts driven by the gear ring 20, but may be distributed unequally by applying either brake. The application of both brakes will check the operation entirely or overcome the effect of any sudden increase in speed.

My improved gearing is designed more particularly for use upon tractors, the shaft 8 being intended to be operatively connected with the rear propelling wheels, the shaft 23 with the front or steering wheel or wheels, and the shafts 9 and 24 with machinery to be driven when the tractor is stationary. Assuming the clutches 11, 27 and 33 to be released, power will be applied to the shafts 7 and 23, the gear 22 running idle on the shaft 24 and the power applied to the shafts 7 and 23 being divided according to the leverage exerted through the gear rings 36 and 20. If it be desired to apply the power equally to the shafts 7 and 23, the clutch sleeve 41 is shifted to release the hub 38 and engage the hub 5. If it be desired to apply all the power to the shaft 23, the sleeve 41 is shifted to the position shown in the drawing and the clutch 10 is released. This adjustment will be advantageous when it is desired to make a short turn with the tractor. To transmit all the power to the shaft 8, the clutch 25 is withdrawn and the clutch 10 is engaged. Obviously, with the sleeve 41 engaging both hubs 5 and 38, all the power may be transmitted through the shaft 7 to any one point by properly adjusting the clutches 10, 11, 25 and 27. When the clutch 33 is thrown in operative position, the lever 34 assists in carrying the strain between the gear rings 19 and 36. Should it be desired to turn quickly without using the hand levers, the brakes 53 and 56 are utilized to differentiate. The clutches 11 and 27 are normally open. Assuming the clutch 33 to be released and the sleeve 41 to be engaged with the hub 38 and free from the hub 5, if the brake 53 be applied a greater proportion of the power will be utilized through the shaft 23 or at the front end of the machine while if the brake 56 be applied a greater proportion of the power will be utilized through the shaft 8 or at the rear end of the machine. If both brakes be applied, the travel of the machine will be checked and may be completely stopped.

If the clutch 33 be released and the clutch 41 shifted free of the hub 5 and into full engagement with the hub 38, there will be a differentiation of the power between the shafts 7 and 23 in the same ratio that the gear ring 36 bears to the gear ring 20.

Having thus described the invention, what is claimed as new is:

1. The combination of a driving shaft, a driven shaft, a master gear rotatable about the driven shaft and actuated directly by the driving shaft, concentric gear rings loose upon the driven shaft, means carried by the master gear for actuating said gear rings, and means for coupling either or both said gear rings to the driven shaft.

2. In gearing, the combination of a driving shaft, a master-gear driven directly by the driving shaft, a driven shaft concentric with the master gear, other shafts disposed parallel with the plane of the master gear, an intermediate gear operatively connected with the master gear, means for operatively connecting said intermediate gear with either or both the last-named shafts, means for connecting the said intermediate gear with the first-mentioned driven shaft, and other means for operatively connecting the master gear with the said driven shaft.

3. In gearing, the combination of a driving shaft, a master gear actuated directly by the driving shaft, a driven shaft about which the master gear is loosely mounted, gear rings loosely mounted upon the driven shaft and provided with clutch hubs on their opposed sides, a clutch member disposed between said clutch hubs and adapted to couple either or both to the driven shaft, and means for adjusting said clutch member.

4. The combination of a driving shaft, a driven shaft, a master gear mounted loosely about the driven shaft, gear rings having their hubs disposed loosely upon the driven shaft and within the hub of the master gear, a third gear ring loosely fitted upon the driven shaft and having a clutch hub opposed to the hub of one of the first-mentioned gear rings, a clutch member disposed between the said hubs and adapted to engage the ends of the same whereby to lock either or both to the driven shaft, means for adjusting said clutch member, a brake drum carried by the last-mentioned gear ring, a brake drum carried by that one of the first-mentioned gear rings disposed at the opposite side of the master gear, and brake bands adapted to co-operate with said brake drums.

In testimony whereof I affix my signature.

JOHN C. ROSS. [L. S.]